US011677739B2

(12) United States Patent
Singhal et al.

(10) Patent No.: US 11,677,739 B2
(45) Date of Patent: Jun. 13, 2023

(54) TOKEN BROKERING IN PARENT FRAME ON BEHALF OF CHILD FRAME

(71) Applicant: Microsoft Technology Licensing, LLC, Redmond, WA (US)

(72) Inventors: Hirsch Patrick Singhal, Seattle, WA (US); Pavel Michailov, Redmond, WA (US); Jason Donchey Nutter, Seattle, WA (US); Adrian Frei, Seattle, WA (US); William Alden Bartlett, Seattle, WA (US); Thomas Lyle Norling, Bellevue, WA (US); Shiung-Vei Yong, Issaquah, WA (US); Prithviraj Sanjeev Kanherkar, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 165 days.

(21) Appl. No.: 17/358,506

(22) Filed: Jun. 25, 2021

(65) Prior Publication Data

US 2022/0417021 A1   Dec. 29, 2022

(51) Int. Cl.
*H04L 9/40*   (2022.01)
*H04L 9/32*   (2006.01)
*H04L 67/146*  (2022.01)
*H04L 67/01*   (2022.01)

(52) U.S. Cl.
CPC ........ *H04L 63/0807* (2013.01); *H04L 9/3213* (2013.01); *H04L 9/3226* (2013.01); *H04L 67/01* (2022.05); *H04L 67/146* (2013.01)

(58) Field of Classification Search
CPC . H04L 63/0807; H04L 9/3213; H04L 9/3226; H04L 67/01; H04L 67/146
See application file for complete search history.

(56) References Cited

U.S. PATENT DOCUMENTS

| 2009/0037806 | A1* | 2/2009 | Yang | H04L 67/02 715/234 |
| 2011/0154130 | A1* | 6/2011 | Helander | H04L 63/168 714/48 |
| 2018/0109539 | A1* | 4/2018 | Enoki | H04L 63/0407 |

(Continued)

OTHER PUBLICATIONS

Kanherkar, Prithvi, "Broker #1: Handshake between Child and Parent #2136", Retrieved from: https://github.com/AzureAD/microsoft-authentication-library-for-js/pull/2136, Aug. 26, 2020, 4 Pages.

(Continued)

*Primary Examiner* — Henry Tsang
(74) *Attorney, Agent, or Firm* — Chin IP, PLLC

(57) ABSTRACT

The disclosed technology is generally directed to web authentication. In one example of the technology, authentication of a broker with an identity provider is initiated. The broker is a first application that is executing in a top-level frame. At the broker, from a second application that is executing on a first descendent frame that is a descendant frame of the top-level frame, a token request is received. Via the broker, a first token is requested from the identity provider on behalf of the second application. The first token is associated with an authorization of secure delegated remote access of at least one resource by the second application. At the broker, from the identity provider, the first token is received. Via the broker, the first token is provided to the second application.

20 Claims, 8 Drawing Sheets

(56) References Cited

U.S. PATENT DOCUMENTS

2018/0367572 A1* 12/2018 Frisbie .................... G06F 21/53
2021/0286861 A1* 9/2021 Churchill ................ G06F 21/10

OTHER PUBLICATIONS

Kanherkar, Prithvi, "Hosted Broker Popup Flow Working", Retrieved from: https://github.com/AzureAD/microsoft-authentication-library-for-js/commit/ba5c06829a5a3a2733d0c2c6a4b2203351cc121e, Mar. 9, 2021, 19 Pages.

"Non Provisional Application Filed in U.S. Appl. No. 17/362,331", filed Jun. 29, 2021, 38 Pages.

* cited by examiner

TOKEN BROKERING IN PARENT FRAME ON BEHALF OF CHILD FRAME

BACKGROUND

Internet-facing applications often deal with various issues of access control. Typically, access control is accomplished by authenticating a user, authorizing the access request, and allowing the request if authorized. In some cases, a user may not be authenticated, but still authorized to receive some form of access. "Secured delegated access" may refer to a means of access control where one entity, such an identity provider, can securely provide authentication in order to grant some form of access to a user.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to web authentication. In some examples, authentication of a broker with an identity provider is initiated. In some examples, the broker is a first application that is executing in a top-level frame. In some examples, at the broker, from a second application that is executing on a first descendent frame that is a descendant frame of the top-level frame, a token request is received. In some examples, via the broker, a first token is requested from the identity provider on behalf of the second application. In some examples, the first token is associated with an authorization of secure delegated remote access of at least one resource by the second application. In some examples, at the broker, from the identity provider, the first token is received. In some examples, via the broker, the first token is provided to the second application.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
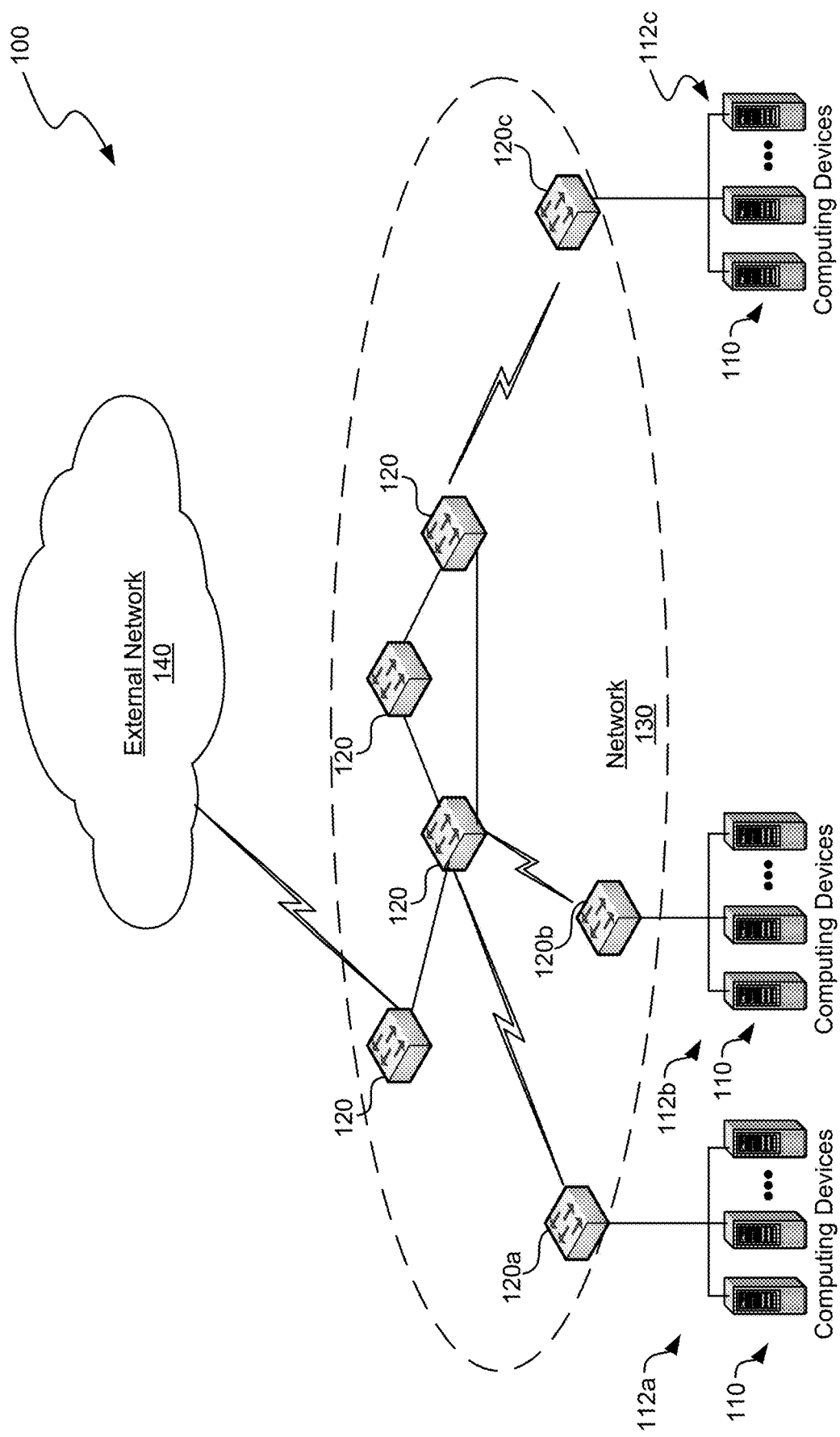
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud, but are devices that serve as an entry point into enterprise or service provider core networks.

Briefly stated, the disclosed technology is generally directed to web authentication. In some examples, authentication of a broker with an identity provider is initiated. In some examples, the broker is a first application that is executing in a top-level frame. In some examples, at the broker, from a second application that is executing on a first descendent frame that is a descendant frame of the top-level frame, a token request is received. In some examples, via the broker, a first token is requested from the identity provider on behalf of the second application. In some examples, the first token is associated with an authorization of secure delegated remote access of at least one resource by the second application. In some examples, at the broker, from the identity provider, the first token is received. In some examples, via the broker, the first token is provided to the second application.

In some examples, an internet-facing application may be embedded inside of another internet-facing application, such as a frame embedded inside of another frame. An inline frame (iframe) is an example of such an embedded frame. For example, one HyperText Markup Language (HTML) document can be embedded inside of another HTML document as an iframe. Multiple levels of embedding may be used. For example, a top-level frame may have one or more embedded children frames, each of the children frames may have one or more embedded children frames, and so on. In the HTML context, in some examples, the top-level frame is the frame that corresponds to the Uniform Resource Locator (URL) in the address bar of the browser. A child frame of one or more degrees (such as a direct child, a child of a child, a child of a child of a child, and so on) may be referred to as a descendant frame.

In some examples, an internet-facing application may access one or more resources through secure delegated access, with the secure delegated access managed through communication with an identity provider. In some examples, the secure delegated access allows an application to remotely access resources via tokens. In some examples, tokens are provided by an identity provider upon successful validation to a requesting party, and enable an application with the token remote access to a resource that requires authentication to access, such an application programming interface (API) that can be called remotely.

However, in some scenarios, an application that is executing on a child frame, since it is hosted on a different domain than the parent frame, is a "third party" and is not allowed to successfully request a token from an identity provider. For example, a browser may prohibit third-party cookies. In some examples, one descendent frame of the top-level frames is used to execute a token broker, which may request tokens on behalf of applications running on other descendent frames of the top-level frame.

In some examples, one common web development pattern is the use of iframes to reuse content and set secure boundaries between applications. For example, a website may host both a payments processor and a spell-checker that accepts untrusted user input. In these scenarios, iframes may be used to keep these applications secure from each other. However, even though the applications may be kept secure from each other via iframes, it may still be necessary for an identity provider to track the authentication state of each of the separate applications in order to properly provide secure delegated access to resources to each of the separate applications.

An embedded application that is executing on a child frame may operate on a user's behalf with authorization in the form of authenticated API calls. In some examples, the authentication for the authenticated API calls is accomplished by tokens that are managed by an identity provider with which the application is registered. In some examples, an embedded application that is executing on a child frame can acquire such tokens needed for authenticated API calls via communication with the broker executing on the top-level frame. The broker may request tokens for the embedded application from the identity provider on the embedded application's behalf. In some examples, through communication with the broker, the identity provider can track the authentication state of the embedded application even in scenarios in which third-party cookies are disallowed.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices no, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices no and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is a device that is configured to be part of a process for token brokering in a parent frame on behalf of a child frame.

Illustrative Computing Device

Figure 2:
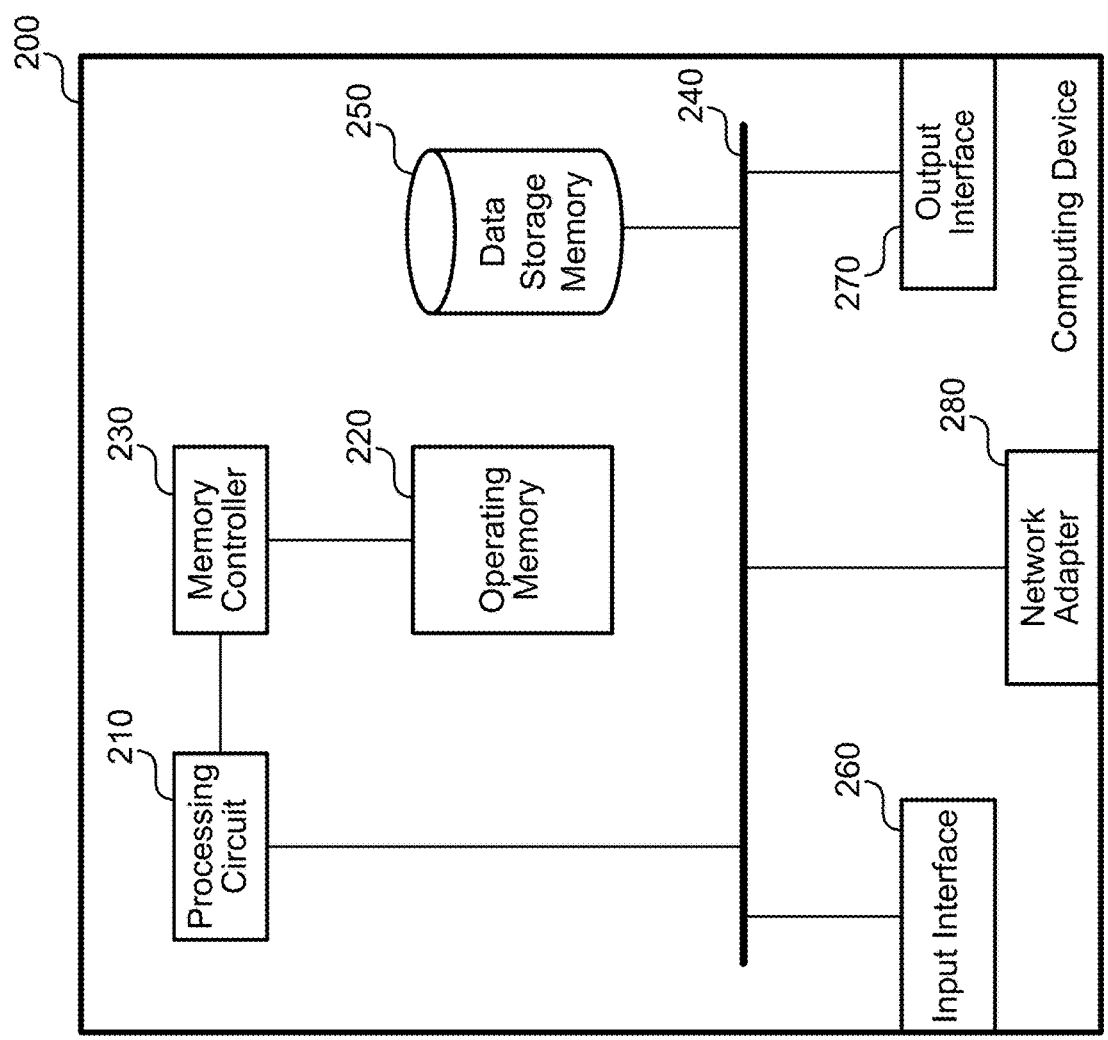
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be a server device such as an application server computer, a virtual computing host computer, or a file server computer, e.g., computing device 200 may be an example of computing device 110 or network node 120 of FIG. 1. Likewise, computer device 200 may be an example any of the devices, a device within any of the distributed systems, illustrated in or referred to in FIG. 3, FIG. 4, FIG. 6, and/or FIG. 7, as discussed in greater detail below. As illustrated in FIG. 2, computing device 200 may include processing circuit 210, operating memory 220, memory controller 230, bus 240, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although FIG. 2 illustrates bus 240 as a single passive bus, other configurations, such as a collection of buses, a collection of point-to-point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Figure 6:
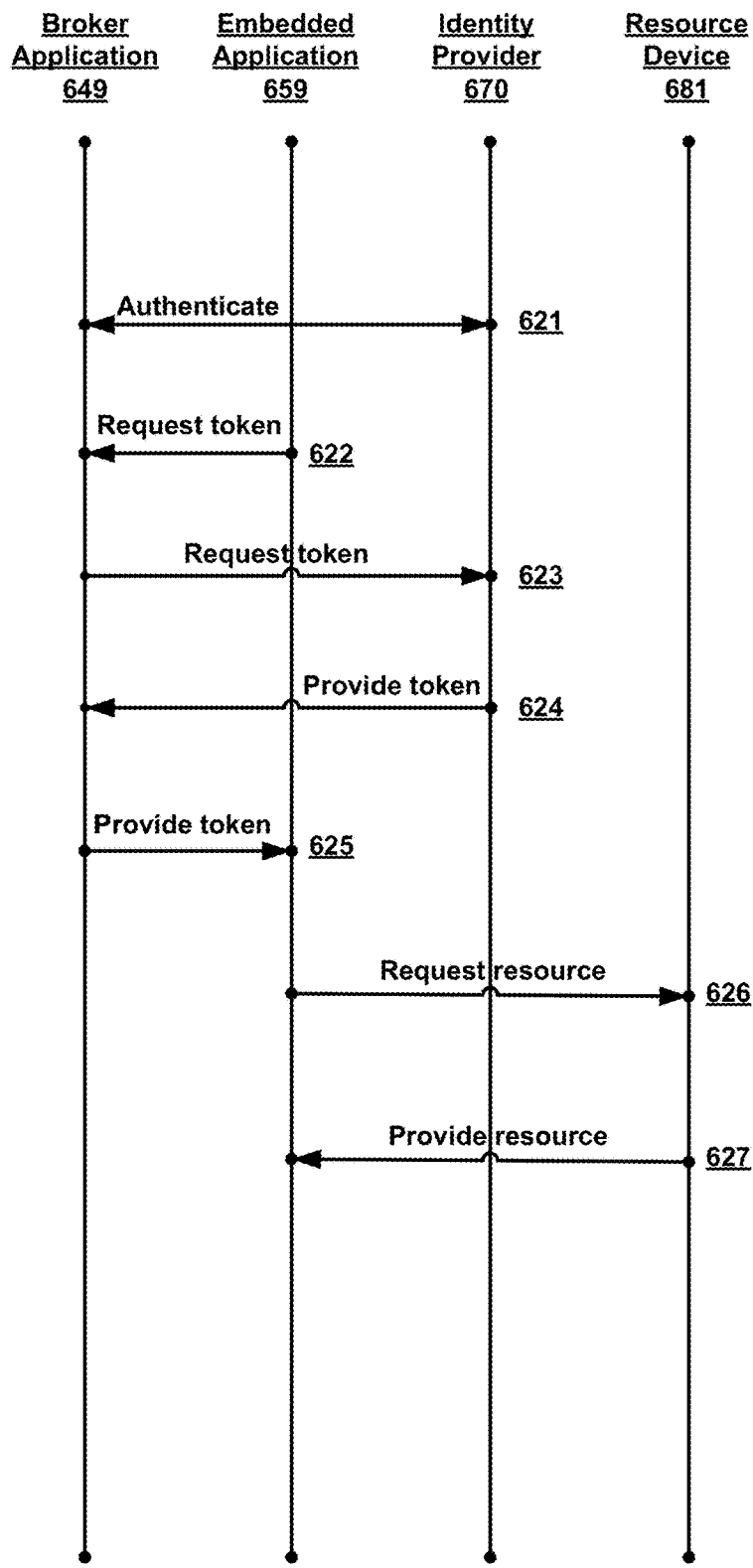
FIG. 6 is a diagram illustrating an example dataflow for token brokering in a parent frame.
Figure 7:
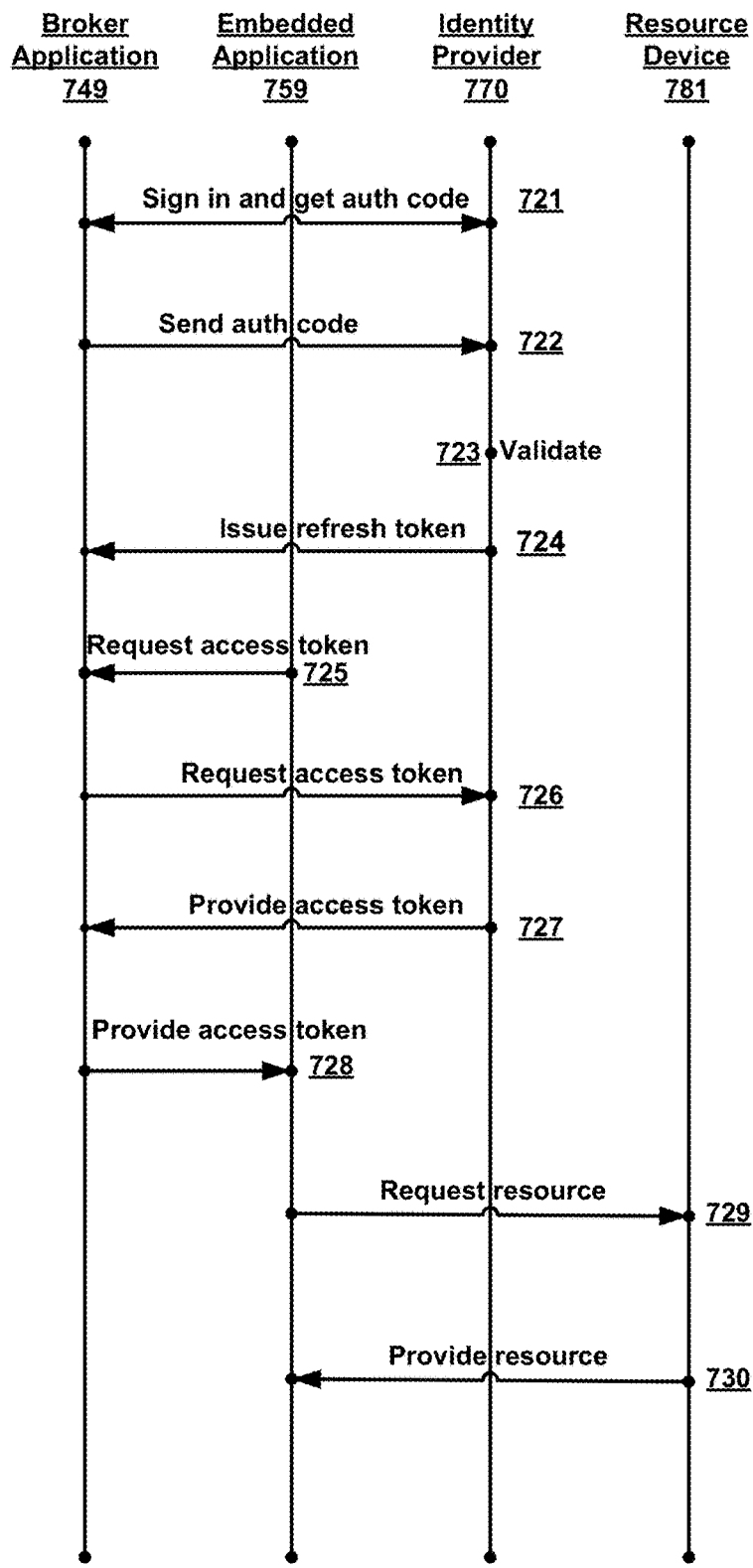
FIG. 7 is a diagram illustrating another example dataflow for token brokering in a parent frame.
Figure 8:
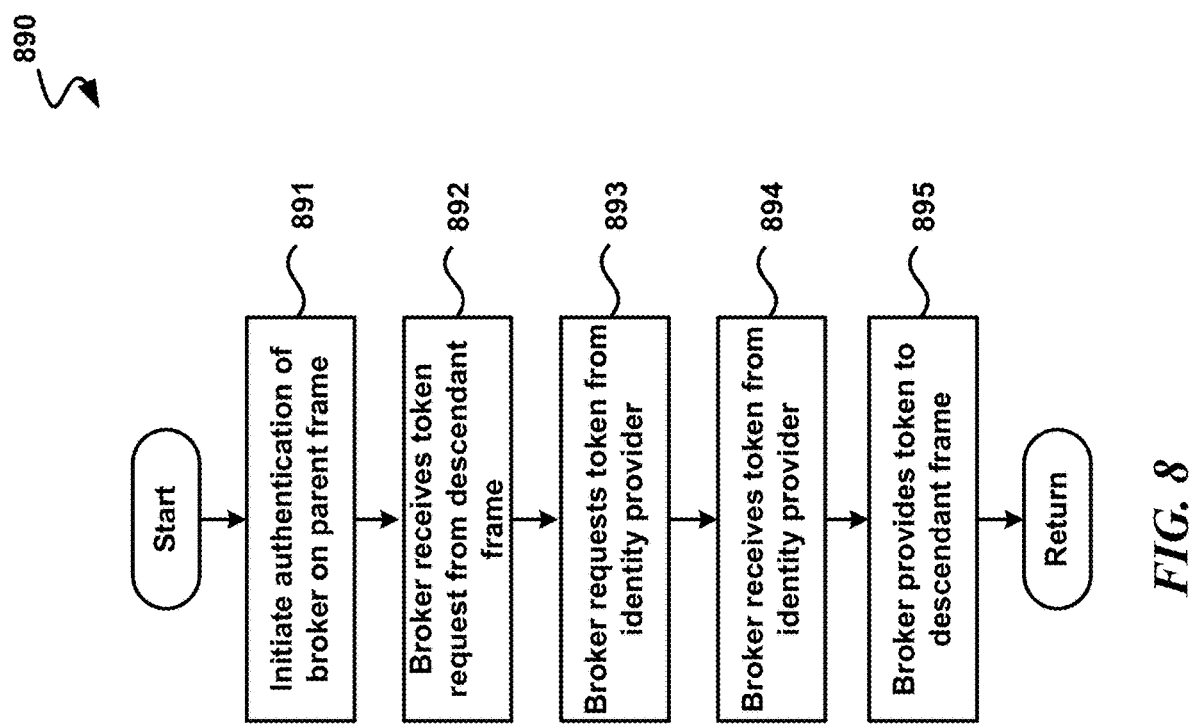
FIG. 8 is a flow diagram illustrating an example process for token brokering in a parent frame, in accordance with aspects of the present disclosure.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions, where the actions may include, in some examples, actions for one or more processes described herein, such as one or more of the processes shown in one of more of FIG. 6, FIG. 7, and/or FIG. 8 as discussed in greater detail below.

Illustrative System

Figure 3:
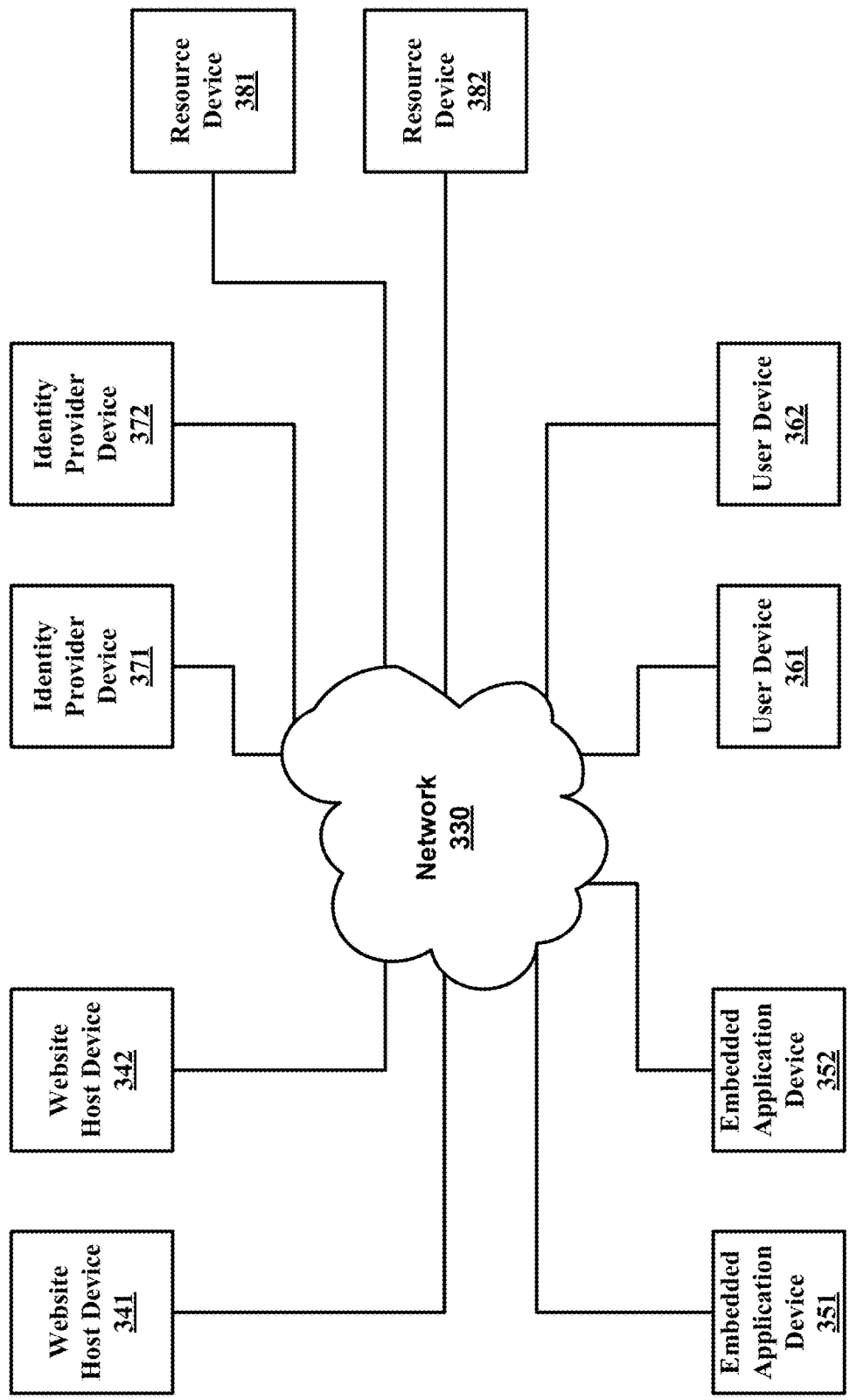
FIG. 3 is a block diagram illustrating an example of a network-connected system.

FIG. 3 is a block diagram illustrating an example of a system (300). System 300 may include network 330, as well as website host devices 341 and 342; embedded application devices 351 and 352; user devices 361 and 362; identity provider devices 371 and 372; and resource devices 381 and 382, which, in some examples, all connect to network 330.

Each of website host devices 341 and 342, embedded application devices 351 and 352, user devices 361 and 362, identity provider devices 371 and 372, and resource devices 381 and 382 may include examples of computing device 200 of FIG. 2. FIG. 3 and the corresponding description of FIG. 3 in the specification illustrates an example system for illustrative purposes that does not limit the scope of the disclosure.

In some examples, website host devices 341 and 342 are part of a distributed system that hosts a website that executes in a parent frame. In some examples, embedded application devices 351 and 352 are part of a distributed system that controls one or more embedded applications that execute in a frame that is a descendent frame of the parent frame of website host devices 341 and 342. In some examples, resource devices 381 and 382 are part of one or more distributed systems that provide one or more resources to entities that are entitled to access those resources, where access of some or all of the resources may require authentication. In some examples, identity provider devices 371 and 372 are part of a distributed system that provides secure deleted access to at least one of the resources of resource devices 381 and 382.

In some examples, user devices 361 and 362 are devices of one or more users that make use of one or more services, which may include services of the website host of website host devices 341 and 342, services associated with an embedded application executing on embedded application devices 351 and 352, services associated with the resources of one or more of resource devices 381 and 382, and/or authentication and/or authorization services associated with identity provider devices 371 and 372. In some examples, webhost host devices 341 and 342 may control a broker application that executes in the parent frame, where the broker application may acquire tokens on behalf of the embedded application that is associated with embedded application device 351 and 352 for accessing a resource associated with at least one of the resource devices 381 and 382.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. In essence, network 330 may include any suitable network-based communication method by which information may travel among website host devices 341 and 342, embedded application devices 351 and 352, user devices 361 and 362, identity provider devices 371 and 372, and resource devices 381 and 382. Although each device is shown connected as connected to network 330, that does not necessarily mean that each device communicates with each other device shown. In some examples, some devices shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown instead communicating with each other with a different network of the multiple networks.

System 300 may include more or less devices than illustrated in FIG. 3, which is shown by way of example only.

Figure 4:
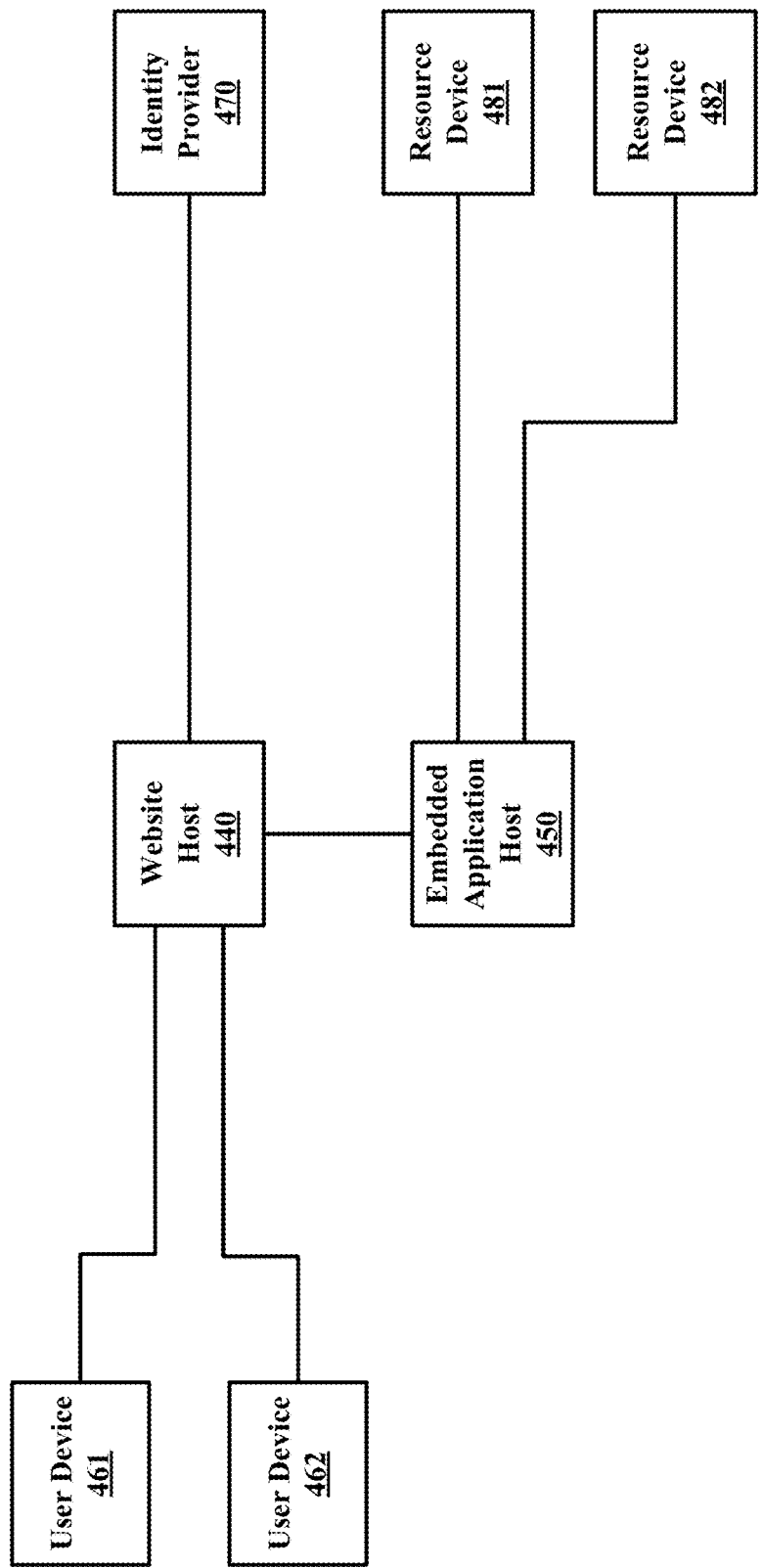
FIG. 4 is a block diagram illustrating an example of a system for token brokering in a parent frame.

FIG. 4 is a block diagram illustrating an example of a system (400). System 400 may be an example of system 300 of FIG. 3, or vice versa. System 400 may be a system for token brokering in a parent frame. System 400 may include website host 440, embedded application host 450, user devices 461 and 462; identity provider 470, and resource devices 481 and 482. In some examples, website host 440, embedded application host 450, and identity provider 470 are distributed systems that each include one or more devices. In some examples, identity provider 470 includes one or more authorization servers.

In some examples, website host 440 hosts a website on a top-level frame, and embedded application host 450 hosts an application in a descendent frame of the top-level frame of website host 440. In some examples, resource devices 481 and 482 provide one or more resources to entities that are entitled to access those resources. In some examples, access to the resources of resource devices 481 and 482 may be obtained through secure delegated access that is managed by identity provider 470. For instance, in some examples, identity provider 470 may provide access to authenticated API calls associated with one or more of resource device 481 and 482. In other examples, identity provider 470 may provide access to other suitable resources associated with one or more of resource devices 481 and 482.

In some examples, identity provider 470 may manage secure delegated access to resources by managing tokens. In some examples, the tokens are associated with secure delegated access. In some examples, a token may prove or otherwise indicate that a party has been authenticated or authorized. In some examples, the tokens managed by identity provider 470 may include access tokens and refresh tokens. In some examples, access tokens may be used to access a resource directly. In some examples, access tokens have an expiration date and a relatively short lifetime. In some examples, refresh tokens also have an expiration date, but have longer lifetimes than an access token, and refresh tokens may be used by an application to acquire new access tokens from identity provider 470.

In some examples, website host 440 and embedded application host 450 are each registered with identity provider 470 in order to get secure delegated access to resources. Users of user devices such as user devices 461 and 462 may by users of services, such as services provided by website host 440, embedded application host 450, resource device 481, resource device 482, and/or authentication/authorization services provided by identity provider 470.

In some examples, embedded application host 450 cannot successfully directly request tokens on behalf of users from identity provider 470. In some examples, embedded application host 450 and website host 440 have a brokering relationship by which a broker application executing on the top-level frame associated with website host 440 may request tokens from identity provider 470, for embedded application 450 on behalf of users of embedded application 450, and provide an access token to embedded application 450 upon receiving the access token from identity provider 470. Embedded application 450 may then use the access token received from the broker application executing on the top-level frame to access the associated resource via the secure delegated access provided by the access token.

Figure 5:
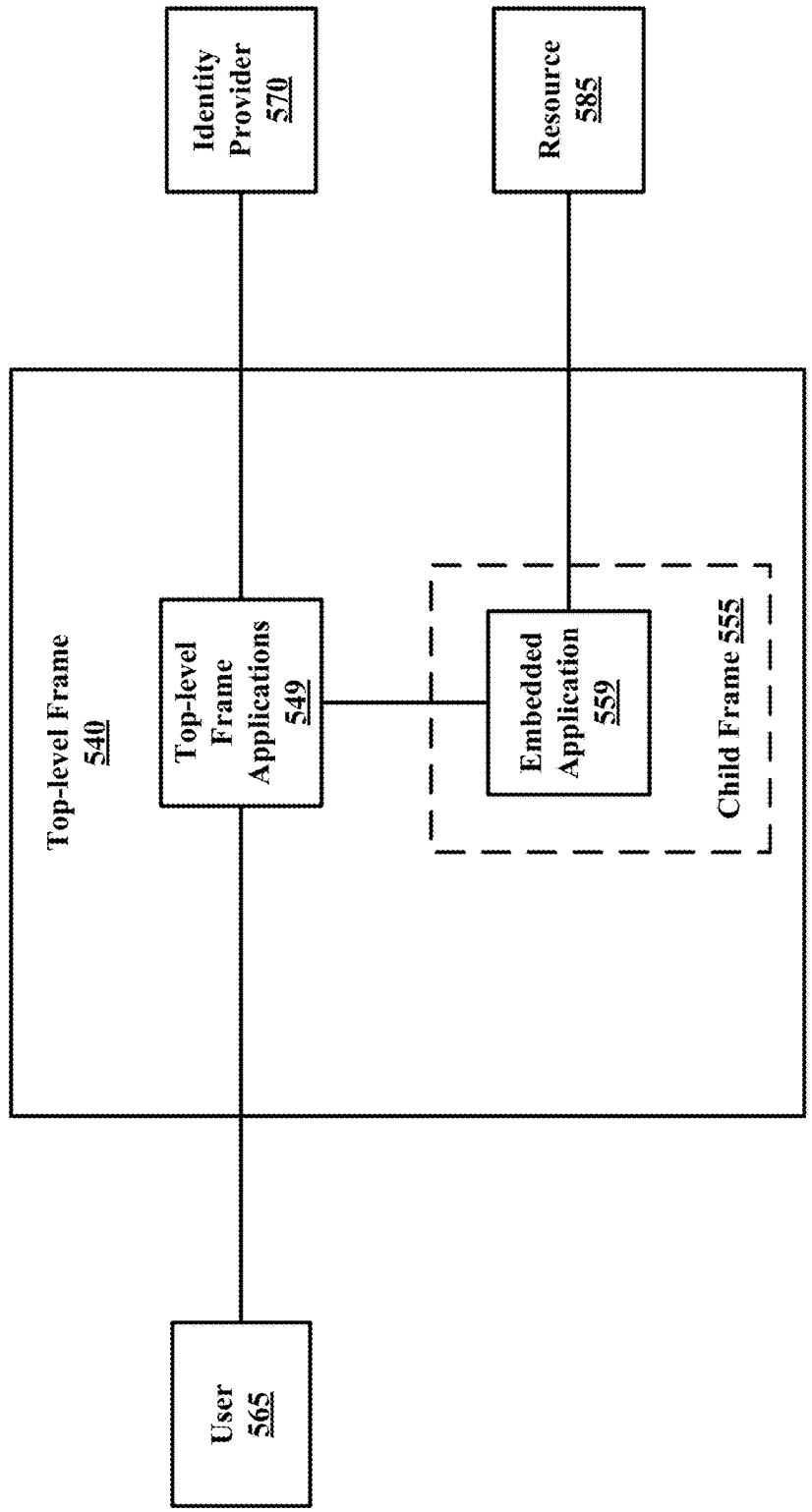
FIG. 5 is a functional block diagram illustrating an example of the system of FIG. 4.

FIG. 5 is a functional block diagram illustrating an example of a system (500). System 500 may be an example of system 400 of FIG. 4. System 500 may be a system for token brokering in a parent frame. System 500 may include top-level frame 540, child frame 555, user 565, identity provider 570, and resource 585. Top-level frame 540 may include top-level frame applications 549. Child frame 555 may include embedded application 559. In some examples, child frame 555 is a child frame of top-level frame 549.

In some examples, resource 585 is a resource that may be provided to entities that are entitled to access resource 585. In some examples, access to resource 585 may be obtained through secure delegated access that is managed by identity provider 570. For instance, in some examples, resource 585 is an authenticated API call. In other examples, resource 585 is another suitable resource.

In some examples, identity provider 570 may manage secure delegated access to resources, including resource 585, by managing tokens. In some examples, the tokens are associated with secure delegated access to resources, including resource 585. In some examples, the tokens managed by identity provider 570 may include access tokens and refresh tokens. In some examples, access tokens may be used to access a resource (e.g., resource 585) directly. In some examples, refresh tokens may be used by an application to acquire new access tokens from identity provider 570.

In some examples, embedded application 559, executing in child frame 555, cannot successfully directly request tokens on behalf user 565 from identity provider 570. In some examples, embedded application 559 and top-level frame applications 549 have a brokering relationship by which a broker in top-level frame applications 549 may request tokens from identity provider 570, for embedded application 559 on behalf of users of embedded application 559, and provide an access token to embedded application 559 upon receiving the access token from identity provider 570. Identity provider 570 may then use the access token received from the broker application executing on top-level frame 540 to access resource 585 via the secure delegated access provided by the access token.

In some examples, the broker application in top-level frame applications 549 may obtain an access token on behalf of embedded application 559 as follows. In some examples, the broker application of top-level frame applications 549 communicates with identity provider 570 to sign in to identity provider 570 and to get an authorization code, the top-level frame doing a full-page redirect of user 565 to the login page of identity provider 570. The broker application of top-level frame applications 549 may then send the authorization code to identity provider 570 in order to redeem the authorization code for a refresh token. Identity provider 570 may then issue a refresh token to the broker application of top-level frame applications 549 upon successful validation. In some examples, each refresh token includes a secure cryptographic resource. In some examples, the broker application of top-level frame applications 549 may use the refresh token to obtain an access token from identity provider 570 when embedded application 559 requests an access token from the broker application.

In some examples, top-level frame applications 549 and embedded application 559 are each registered with identity provider 570 in order to get secure delegated access to resources, including resource 585. User 565 may be a user of services, such as services provided by top-level frame applications 549, embedded application 559, and/or authentication/authorization services provided by identity provider 570.

In some examples, the access to resource 585 and the authorization model of the broker in top-level frame applications 549 is authorized by the developer of embedded application 559 and/or by the user 565 or an administrator of an organization to which user 565 belongs. In some examples, embedded application 559 is so authorized to access resource 585, and the broker application in top-level frame applications 549 is authorized to obtain tokens on behalf of embedded application 559. In some examples, two authorization records for these two authorizations are stored on identity provider 570: one authorization record for the authorization of embedded application 559 to access resource 585, and another authorization record for the authorization of the broker application in top-level frame applications 549 to act as a token broker for embedded application 559.

In some examples, the authentication of the broker application of top-level frame applications 559 and the authentication of embedded application both use validation of the origin of the request for the authentication. In some examples, identity provider 570 authenticates the broker application of top-level frame applications 549 using the redirect URL. In some examples, the broker application of top-level frame applications 559 authenticates embedded application 559 by obtaining the origin of embedded application 559 using a Document Object Model (DOM) API that is not spoofable by embedded application 559. Accordingly, in some examples, the broker application of top-level frame applications 559 can broker only on behalf of an application for which the broker application is authorized to do so, and an application cannot improperly gain access to resource 585 by pretending to be a different application.

Specific examples of process flow for the brokering are discussed in greater detail below with regard to FIG. 6 and FIG. 7.

FIG. 6 is a diagram illustrating an example dataflow for a process (620) for token brokering in a parent frame. FIG. 6 and the corresponding description of FIG. 6 in the specification illustrate an example process for illustrative purposes that do not limit the scope of the disclosure.

In the illustrated example, first, step 621 occurs. At step 621, in some examples, broker application 649 authenticates itself with identity provider 670. In some examples, broker application 649 is an application that is executing in a top-level frame. In some examples, broker application 649 is registered with identity provider 670 prior to the beginning of process 620. The exact process by which broker application 649 authenticates itself with identity provider 670 may be accomplished in various ways in various different examples.

As shown, step 622 occurs next in some examples. In step 622, in some examples, embedded application 659 makes a request for a token from broker application 649. In some examples, this request may be prompted based on the need to access a resource for a user of embedded application 659. In some examples, embedded application 659 is executing in a frame that is a descendent frame of the top-level frame in which broker application 649 is executing.

As shown, step 623 occurs next in some examples. In step 623, in some examples, broker application 649 requests a token for embedded application 649 from identity provider 670. As shown, step 624 occurs next in some examples. At step 624, in some examples, identity provider 670 provides the requested token to broker application 649. In some examples, the token is a token that may be used to gain authorized access to a resource that is associated with resource device 681. In some examples, the token is an identity token that identities the user.

As shown, step 625 occurs next in some examples. In step 625, in some examples, broker application 649 provides the requested token to embedded application 659. As shown, step 626 occurs next in some examples. In step 626, in some examples, embedded application 659 communicates a request to resource device 681 to access a resource, where the request includes the access token. As shown, step 627 occurs next in some examples. In step 627, in some examples, resource device 681 provides the resources to embedded application 659 upon authentication that is granted based on the access token.

FIG. 7 is a diagram illustrating an example dataflow for a process (720) for token brokering in a parent frame. Process 720 may be an example of process 620 of FIG. 6.

In some examples, users may be users of services of a website host, an embedded application host, and identity provider 770. A user may have an account with identity provider 770. The website host may host a website that executes in a top-level frame, where broker application 749 also executes in the top-level frame. The embedded application host may host an embedded application 759 that executes in an iframe that is a descendent iframe of the top-level frame. In some examples, broker application 749 is registered with identity provider 770. In some examples, embedded application 759 is authorized to access a specific resource, such as such as a specific resource of resource device 781, and website broker application 749 is authorized to obtain tokens on behalf of embedded application 759, by the developer of embedded application 759 and/or by the user or an administrator of an organization to which the user belongs.

In the illustrated example, first, step 721 occurs. At step 721, in some examples, broker application 749 communicates with identity provider 770 to sign in to identity provider 770 and to get an authorization code. In some examples, step 721 is accomplished by the top-level frame doing a full-page redirect of the user to the login page of identity provider 770. As shown, step 722 occurs next in some examples. In step 722, in some examples, broker application 749 sends the authorization code to identity provider 770 in order to redeem the authorization code for a refresh token. As shown, step 723 occurs next in some examples. In step 723, in some examples, identity provider 770 validates the authorization code received at step 722.

As shown, step 724 occurs next in some examples. In step 724, in some examples, if the validation performed at step 723 was successful, identity provider 770 issues a refresh token to broker application 749. As shown, step 725 occurs next in some examples. In step 725, in some examples, embedded application 759 requests an access token from broker application 749. In some examples, the request may be prompted on a user's behalf based on a resource to be obtained on the user's behalf. In some examples, the request may be prompted in order to learn the identity of a user through an ID token.

As shown, step 726 occurs next in some examples. In step 726, in some examples, broker application 749 uses the refresh token to request an access token for embedded application 759 from identity provider 770. As shown, step 727 occurs next in some examples. At step 727, in some examples, identity provider 770 provides the requested access token to broker application 749. As shown, step 728 occurs next in some examples. In step 728, in some examples, broker application 749 provides the requested access token to embedded application 759.

As shown, step 729 occurs next in some examples. In step 729, in some examples, embedded application 759 communicates a request to resource device 781 to access a resource, where the request includes the access token. In some examples, the resource is an authenticated API. In other examples, the resource is a different suitable resource. As shown, step 730 occurs next in some examples. In step 730, in some examples, resource device 781 provides the resource to embedded application 759 upon authentication that is granted based on the access token.

In this way, in some examples, embedded application 759 can be authenticated without reliance on third-party cookies.

FIG. 8 illustrates an example dataflow for a process (890) for chatbot conversation management. In some examples, process 890 is performed by a device, distributed system, or the like, such as, for instance, device 200 of FIG. 2, one or more of identity provider devices 371 and 372 of FIG. 3, identity provider 470 of FIG. 4, identity provider 570 of FIG. 5, identity provider 670 of FIG. 6, identity provider 770 of FIG. 7, or the like.

In the illustrated example, step 891 occurs first. At step 891, in some examples, authentication of a broker with an identity provider is initiated. As shown, step 892 occurs next in some examples. In some examples, the broker is a first application that is executing in a top-level frame. At step 892, in some examples, at the broker, from a second application that is executing on a first descendent frame that is a descendant frame of the top-level frame, a token request is received.

As shown, step 893 occurs next in some examples. At step 893, in some examples, via the broker, a first token is requested from the identity provider on behalf of the second application. In some examples, the first token is associated with an authorization of secure delegated remote access of at least one resource by the second application. As shown, step 894 occurs next in some examples. At step 894, in some examples, at the broker, from the identity provider, the first token is received. As shown, step 895 occurs next in some examples. At step 895, in some examples, via the broker, the first token is provided to the second application. The process may then advance to a return block, where other processing is resumed.

Conclusion

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
   at least one memory adapted to store run-time data, and at least one processor that is adapted to execute processor-executable code that, in response to execution, enables the apparatus to perform actions, including:
   initiating authentication of a broker with an identity provider, wherein the broker is a first application that is executing in a top-level frame;
   receiving, at the broker, from a second application that is executing on a first descendent frame that is a descendant frame of the top-level frame, a token request;
   via the broker, requesting a first token from the identity provider on behalf of the second application, wherein the first token is associated with an authorization of secure delegated remote access of at least one resource by the second application;
   receiving, at the broker, from the identity provider, the first token; and
   via the broker, providing the first token to the second application.

2. The apparatus of claim 1, wherein the first descendent frame is a child frame of the top-level frame.

3. The apparatus of claim 1, wherein the first descendent frame is an inline frame of the top-level frame.

4. The apparatus of claim 1, wherein the first token is an access token.

5. The apparatus of claim 1, wherein initiating the authentication of the broker includes:
   redirecting a user from the top-level frame to the identity provider; and
   receiving, via the broker, an authorization code from the identity provider.

6. The apparatus of claim 1, wherein the at least one resource includes an authenticated application programming interface (API) call.

7. The apparatus of claim 1, wherein the first token is an identity token that identifies a user.

8. The apparatus of claim 1, wherein requesting the first token from the identity provider is accomplished via a browser that prohibits third-party cookies.

9. The apparatus of claim 1, the actions further including:
   requesting, via the broker, a refresh token from the identity provider; and
   receiving the refresh token from the identity provider.

10. The apparatus of claim 9, wherein requesting the first token from the identity provider includes making the request for the first token from the identity provider such that the request includes the refresh token.

11. A method, comprising:
    sending authentication communication from a broker to an identity provider, wherein the broker is a first application that is executing in a top-level frame;
    receiving, at the broker, a token request from a second application that is executing on a first descendent frame that is a descendant frame of the top-level frame;
    communicating a token request from the broker to the identity provider on behalf of the second application, wherein the token request is a request for a first token that is associated with an authorization of secure delegated remote access of at least one resource by the second application;
    receiving, at the broker, the first token from the identity provider; and
    communicating the first token from the broker to the second application.

12. The method of claim 11, wherein sending the authentication communication includes:
    redirecting a user from the top-level frame to the identity provider; and
    receiving, via the broker, an authorization code from the identity provider.

13. The method of claim 11, wherein the descendant frame has provided authorization to the top-level frame to act as a broker on behalf of the first descendant frame.

14. The method of claim 11, further comprising:
    requesting, via the broker, a refresh token from the identity provider, and
    receiving the refresh token from the identity provider.

15. The method of claim 14, wherein requesting the first token from the identity provider includes making a request for the first token from the identity provider such that the request includes the refresh token.

16. A processor-readable storage medium, having stored thereon processor-executable code that, upon execution by at least one processor, enables actions, comprising:
    beginning a communication of authentication of a token broker application with an authorization server, wherein the token broker application is executing in a top-level frame;
    receiving, at the token broker application, a token request from an embedded application that is executing on a first descendent frame that is a descendant inline frame of the top-level frame;
    via the token broker application, requesting an access token from the authorization server on behalf of the embedded application, wherein the access token is associated with an authorization of secure delegated remote access of at least one resource by the embedded application;

receiving, at the token broker application, from the authorization server, the requested access token; and via the token broker application, providing the requested access token to the embedded application.

17. The processor-readable storage medium of claim 16, wherein beginning the communication of the authentication of the token broker application includes:

redirecting a user from the top-level frame to the authorization server, and receiving, via the token broker application, an authorization code from the authorization server.

18. The processor-readable storage medium of claim 16, wherein the at least one resource includes an authenticated application programming interface (API) call.

19. The processor-readable storage medium of claim 16, the actions further comprising:

requesting, via the token broker application, a refresh token from authentication server; and receiving the refresh token from the authentication server.

20. The processor-readable storage medium of claim 19, wherein requesting the access token from the authentication server includes making a request for the access token from the authorization server such that the request includes the refresh token.

* * * * *